(12) United States Patent
Fliermans

(10) Patent No.: US 6,479,558 B1
(45) Date of Patent: Nov. 12, 2002

(54) MICROBIAL PROCESSING OF USED RUBBER

(75) Inventor: Carl B. Fliermans, Augusta, SC (US)

(73) Assignee: Westinghouse Savannah River Company, Aiken, SC (US)

(*) Notice: Subject to any disclaimer, the term of this patent is extended or adjusted under 35 U.S.C. 154(b) by 0 days.

(21) Appl. No.: 09/542,744

(22) Filed: Apr. 4, 2000

(51) Int. Cl.⁷ .................................................. C08J 11/04
(52) U.S. Cl. ........................... 521/41; 521/40; 521/40.5
(58) Field of Search ........................... 521/40, 40.5, 41; 435/262, 130, 166, 167

(56) References Cited

U.S. PATENT DOCUMENTS

| | | | |
|---|---|---|---|
| 4,104,205 A | 8/1978 | Novotny et al. | |
| 4,332,700 A | 6/1982 | Munih | |
| 4,341,667 A * | 7/1982 | Lal et al. ................... | 525/211 |
| 4,641,667 A * | 7/1982 | Lal et al. ................... | 525/211 |
| 4,456,688 A | 6/1984 | Dugan et al. | |
| 4,469,573 A | 9/1984 | Minih | |
| 4,469,817 A | 9/1984 | Hayashi et al. | |
| 4,647,443 A | 3/1987 | Apffel | |
| 4,665,101 A | 5/1987 | Ficker | |
| 4,770,741 A | 9/1988 | Day | |
| 5,120,767 A | 6/1992 | Allard et al. | |
| 5,258,413 A | 11/1993 | Isayev | |
| 5,275,948 A * | 1/1994 | Straube et al. ............. | 435/262 |
| 5,284,625 A | 2/1994 | Isayev et al. | |
| 5,358,869 A | 10/1994 | Kilbane, II | |
| 5,362,759 A | 11/1994 | Hunt et al. | |
| 5,387,523 A | 2/1995 | Monticello | |
| 5,458,752 A | 10/1995 | Lizama et al. | |
| 5,506,123 A | 4/1996 | Chieffalo et al. | |
| 5,510,265 A | 4/1996 | Monticello | |
| H1531 H | 5/1996 | Blumentals et al. | |
| 5,578,700 A | 11/1996 | Hunt et al. | |
| 5,597,851 A * | 1/1997 | Romine et al. ............. | 521/41 |
| 5,849,970 A | 12/1998 | Fall et al. | |
| 5,897,996 A | 4/1999 | Kimbara et al. | |

OTHER PUBLICATIONS

Section on "Rubber Recycling Emphasis", *Rubber & Plastics News*, Oct. 7, 1996, pp. 9, 11, 12, 13, 15, 16, 18–27.
"Microbial Processing of Waste Tire Rubber", Robert A. Romine, Margaret F. Romine & Lesley Snowden–Swan, Pacific Northwest Laboratories, Richland, WA, presented at the Rubber Division, American Chemical Society, Cleveland, OH, Oct. 17–20, 1995 (15 pages total).

* cited by examiner

*Primary Examiner*—Edward J. Cain
*Assistant Examiner*—Katarzyna W. Lee
(74) *Attorney, Agent, or Firm*—Dority & Manning, PA

(57) ABSTRACT

A process and resulting product is provided in which a vulcanized solid particulate, such as vulcanized crumb rubber, has select chemical bonds broken by biotreatment with thermophillic microorganisms selected from naturally occurring isolates derived from hot sulfur springs. The biotreatment of the crumb rubber renders the treated crumb rubber more suitable for use in new rubber formulations. As a result, larger loading levels and sizes of the treated crumb rubber can be used in new rubber mixtures.

10 Claims, No Drawings

MICROBIAL PROCESSING OF USED RUBBER

BACKGROUND OF THE INVENTION

1. Field of the Invention

The present invention relates broadly to the treatment and recycle of rubber products and still more particularly to the use of recycled crumb rubber. The United States Government has rights to this invention pursuant to contract number DE-AC09-96-SR18500 between the U.S. Department of Energy and Westinghouse Savannah River Company.

2. Discussion of Background

Existing efforts to recycle used rubber, in particular used tires, into new rubber articles, especially tires, have met with only limited commercial success. In the United States alone, there are currently billions of tires stock-piled in long term storage with additional millions being added annually to such stock piles. Because of the large volume involved with tires, this discussion will be directed to tires although many of these comments are applicable to other new and used rubber products.

Because used rubber is usually processed in the form of crumb rubber, references herein will be to rubber in that form. However, crumb rubber is merely one example of a used rubber product suitable for processing as described herein. An existing limitation in the recycling of used tire material is that the used tire rubber cannot be readily mixed in economical proportions to form suitable new tire polymer mixes having acceptable cured properties.

During the vulcanization process of new tires, chemical accelerators, promoters, and/or initiators, are used and large numbers of sulfur-sulfur and sulfur-carbon cross-links are produced in the vulcanized tire rubber. It is generally believed in the art that the sulfur compounds which are present in used tire rubber are detrimental in the curing process when used tire material is mixed with new tire polymer. Formulations having significant levels of used tire rubber particles with new polymer materials result in a brittle compound unsuitable for many uses such as automobile or truck tires. Heretofore, efforts to reclaim scrap rubber have frequently included a physical sheering process which is suitable for a rubber which can be mixed with asphalt, forming asphalt rubber. Such use is taught in U.S. Pat. No. 5,304,576.

It is also known to take used rubber and depolymerize the vulcanized rubber in an organic solvent and then recover various polymerized fractions as taught in U.S. Pat. No. 5,438,078. Similarly, U.S. Pat. No. 5,264,640 teaches taking scrap rubber from used tires and regenerating the monomeric chemicals which are subsequently recovered. This method uses gaseous ozone to break down the crosslinked structure of the rubber followed by thermal depolymerization in a reaction chamber. U.S. Pat. No. 5,369,215 teaches a similar process in which used tire material may be depolymerized under elevated temperatures and at a reduced pressure to recover the monomeric compounds.

U.S. Pat. No. 4,104,205 teaches a microwave method to devulcanize rubber from hose end trim and butyl tire bladders. While tire tread material was also treated, difficulties in exothermic reactions and physical properties of the microwaved materials were noted.

U.S. Pat. No. 4,341,667 teaches that the green strength of elastomers reclaimed through heat, microwave, chemical treatments, or physical shearing can be improved by the addition of butene polymers.

U.S. Pat. No. 5,275,948, incorporated herein by reference, teaches the use of chemolithotrophic microorganisms to remove sulfur from the surface of finely ground scrap rubber. Preferred organisms include Thiobacillus species which oxidize elemental sulfur to sulfuric acid and which are released into the suspension culture.

U.S. Pat. No. 5,597,851, incorporated herein by reference, teaches the use of microorganisms to desulfurize finely ground rubber particles. Thiobacillus sp. and *Sulfolobus acidocaldarius* are used to bioprocess rubber particles for at least 24 hours but prior to complete oxidation of surface sulfur.

The present application relates to commonly assigned U.S. Application having Ser. No. 09/542,394, filed Apr. 4, 2000, entitled "Combination Biological and Microwave Treatments of Used Rubber" and having Attorney Docket No. WSR-14, and which is incorporated herein by reference. The present application also relates to commonly assigned U.S. patent application Ser. No. 09/542,201, filed Apr. 4, 2000, entitled "Microwave Treatment of Vulcanized Rubber", and which is incorporated herein by reference.

There remains a strong need for a practical, economical system for processing used rubber into a material which can be incorporated at a substantial loading level into new rubber compounding mixtures. Further, there is room for improvement with respect to bioprocessing of used rubber, particularly in the selection of microorganisms, the selection of starting material, and overall process conditions and parameters.

SUMMARY OF THE INVENTION

The present invention is a process and the resulting product of the process in which previously vulcanized (used) rubber may be incorporated into polymer mixes for new rubber products, including tires, at much greater levels than used heretofore.

The present invention also provides a process and a resulting product of the process wherein previously vulcanized, used crumb rubber has the surface chemistry altered to provide a treated crumb rubber product. When compared to untreated crumb rubber, the treated crumb rubber has generally improved properties useful for incorporation with new tire or virgin rubber into automobile and truck tire polymer formulations. The improved properties for the composite polymer formulation include plasticity, elongation @ break, and energy @ break. The properties listed above are typically better than the combination of untreated crumb and new tire rubber mix control values when the combination of biologically treated crumb rubber and new tire rubber are analyzed and evaluated in Banbury tests.

In accordance with this invention, it has been demonstrated that particles of used crumb rubber can be reacted with active cultures of a bacillus-like bacterium isolated from a natural hot sulfur spring. The preferred isolate shows most favorable growth at 65° C. and has been found to react with S—S, and S—C bonds and provide an improved reaction surface on the rubber. In particular, the bacterium interacts with the surface sulfur constituents and alters the surface chemistry and reactivity of the so treated vulcanized crumb tire rubber. It has been found that the biotreatment of the crumb rubber particle changes the surface reactivity of the crumb rubber particles to an extent that the rubber particles can be integrated into a new tire polymer mix at much higher levels than previously accomplished. The biotreatment of the crumb rubber provides a treated rubber product which is compatible with the new rubber polymer component of a tire mix.

The use of the biotreatment to modify select chemical species provides a process which can be carried out on. an economical basis. The process is thought to be particularly useful in that the biotreatment is believed to alter a wide variety of chemical additives used by tire manufacturers and which are present within the used rubber. The ability to alter these chemical constituents, further enhances the usefulness and compatibility of the treated used rubber with new polymer. The biological treatment provides a more standardized crumb rubber for use in recycling operations, including the incorporation of significant quantities and sizes of treated crumb rubber into polymer formulations for automobile and truck tires. Further, the biological organism is itself a renewable, regenerating resource.

The biological treatment process also facilitates the use of used tire rubber as a renewable resource. Accordingly, the biotreatment process enables the use of a heretofore difficult to recycle waste product into a component for high quality, high end cured rubber products.

The use of the biotreatment provides a process and product which can be operated on an economical basis at a commercial scale and does not result in the production of environmentally unacceptable waste products or emissions. Further, the elevated temperatures at which the preferred microorganisms operate can be maintained using waste heat which results from any of several steps in the commercial manufacturing of new rubber articles such as tires.

It is thus an object of this invention to provide a biotreatment process which increases by an effective amount the reactivity of used crumb rubber such that an increased amount of used crumb rubber can be mixed with a new tire polymer mix.

It is another object of this invention to provide a crumb rubber having an improved surface chemistry suitable for use in compounding a new tire rubber mix.

It is still another object of this invention to provide a treated crumb rubber product having a consistent surface chemistry in which polymer degrading constituents have been rendered inactive.

It is yet another object of this invention to provide a compounded rubber mix containing increased amounts of crumb rubber in the formulation.

It is still a further object of the invention to utilize waste heat generated from a rubber curing process to maintain a reactive culture at an elevated temperature such that the culture is kept substantially free of unwanted microbial contamination.

It is yet another object of this invention to provide a compounded rubber mix containing large sizes of a biologically treated rubber particulate.

It is a further object of this invention to provide a process of devulcanizing a rubber particulate in which the devulcanization is substantially limited to targeted chemical species and which leaves the physical properties of the particulate largely unchanged.

These and other objects of this invention are provided by a process for devulcanizing and/or otherwise conditioning or modifying particulate rubber comprising: providing a supply of crumb rubber, said crumb rubber having a plurality of S—S and C—S bonds; exposing the crumb rubber to microorganisms capable of using surface sulfur constituents as metabolic and/or energy sources, thereby oxidizing an effective amount of the C—S and S—S bonds; thereby providing a crumb rubber having a treated surface defining an altered chemical state, the altered state being more reactive during formulation and curing into a new rubber product.

DETAILED DESCRIPTION OF A PREFERRED EMBODIMENT

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention, which broader aspects are embodied in the exemplary constructions.

A process for treating the crumb rubber is based upon the exposure of the crumb rubber to a selected microorganism which targets select chemical bonds. In particular, sulfur-sulfur (S—S) and sulfur-carbon (S—C) bonds on the crumb rubber surface are targeted. The biotreatment is believed to alter other constituents added to rubber, such as accelerators, antioxidants, and stabilizers. Alteration of these other constituents improves the quality of the treated crumb rubber product.

In the initial vulcanization of tire rubber, sulfur and sulfur containing compounds such as accelerators and initiators are added which crosslink with the tire polymer. The bonding and crosslinkage stabilize the polymer matrix, which imparts important desired properties to the rubber and increases the useful life of the tire. The presence of sulfur compounds within vulcanized tire rubber has limited the quantity of vulcanized rubber which may be used in new rubber mixes such as tires. The sulfur containing compounds and other additives present within the previously vulcanized rubber render a final product which is often brittle and has other properties which make it unsuitable for many uses and especially for use as a tire.

As used in the detailed description below, the term "surface devulcanized" is used to indicate that certain surface properties of the particulate crumb rubber have been chemically altered such as by the application of specific microorganisms. It is believed that the surface activity of mono, di, and polysulfides which formed polymer cross linkages during the initial vulcanization process has been altered by the present biotreatment process. As such, the crumb rubber is referred to here as "surface devulcanized" though it is understood that a substantial number of vulcanization products persist in the treated crumb rubber and in fact remain beneficial in the-overall reformulations of new rubber mixes with the treated crumb rubber. Again, it is to be understood that other chemical and/or physical changes may take place which have a beneficial effect on the used rubber when reformulated as part of a new rubber product or mixture.

The work herein uses a 40 mesh truck tread crumb rubber conforming to ASTM standard D5603. The crumb rubber was obtained from a commercial supplier of crumb rubber and is believed to represent a heterogenous mixture of different tire formulations from a variety of manufacturers. It is believed that the crumb rubber can be used over a wide range of particulate sizes, and the process is not size dependent solely for the size ranges used in the manufacturing of tires. For example, standard sizes of 200–40 mesh, tire buffings and even larger sizes are believed to be useful.

The ASTM standard crumb rubber material was chosen for its known uniformity. It is readily appreciated by those having ordinary skill in the art that crumb rubber originating from used passenger or truck tires will typically encompass products originating from numerous manufacturers and comprising an enormous assortment of chemical constituents. Accordingly, a wide variety of different chemicals are expected to be present on the surface of untreated crumb rubber. This is particularly true for the sulfur compounds originally added to the rubber during the vulcanization process. The present invention provides a treatment process which effectively modifies broad classes of reactive chemical constituents associated with the surface and adjacent subsurface of crumb rubber. Accordingly, the treatment process will address expected variations encountered in a commercial source of crumb rubber.

The examples below are intended to illustrate the present invention. The descriptions in no way limit the scope of the present invention.

In the examples, the properties of the combination of crumb and new tire rubber samples and appropriate controls are evaluated as follows:

Plasticity: Measurements carried out in accordance with ASTM Standard D1646.

Scorch: (t5, t35) Measurements carried out in accordance with ASTM Standard D1646.

Minimum Viscosity: Measurements carried out in accordance with ASTM Standard D1646.

Shore Hardness: Measurements carried out in accordance with ASTM Standard D2240.

Modulus of elongation at 300% and 100%: Measurements were carried out in accordance with ASTM Standard D412, test method A.

Tensile Strength: Measurements were carried out in accordance with ASTM Standard D412, test method A.

Elongation @ Break: Measured as a percentage value according to ASTM standard D412, test method A.

Energy @ Break: Measurements carried out in accordance with ASTM Standard D412, test method A as set forth in units of MPa.

G': Measurements carried out in accordance with ASTM Standard D2221.

Tan Delta: Hysteresis is expressed by the measurement of tan delta @ 10 percent deformation and at 23 degrees C in accordance with ASTM Standard D2231.

Analytical Characterization: The analytical protocols set forth in Table 1 and discussed further below are based upon standard ASTM measurements as set forth below.

Acetone extract measurements were made according to ASTM Standard D297-18, 19.

Oxygen measurements were made using commercially available oxygen analyzers.

Polymer ratios were determined according to ASTM Standard D3677.

Zinc oxide (%)—Measurements carried out as set forth in ASTM D297-47.

Macro ash measurements were made according to ASTM Standard D297-37.

EXAMPLE 1

A general protocol found useful in the present treatments is described below. Samples of 40 mesh crumb rubber in 100–1000 gm quantity batches were incubated with log phase cultures of a bacillus-type bacterium isolated from sulfur hot springs. The bacterium used corresponds to culture 157-3 and is available from the inventor at Westinghouse Savannah River Company in Aiken, S.C. The bacteria are thermophillic, chemolithotrophic organisms initially isolated from thermal springs and cultured in a sulfur-based nutritive medium.

At the time of incubation with the crumb rubber, the bacteria are placed in a modified medium of low sulfur concentration to force metabolic degradation of the sulfur bonds and sulfur compounds present on the crumb rubber. The bacteria were mixed with quantity of crumb rubber so as to achieve a concentration (v/v) of 10/40 to 30/40 of microorganisms to crumb rubber. The biotreatment conditions involved continuous agitation within a bioreactor and at a temperature maintained within the range of 50° C. to 70° C. and more preferably 60° C. to 65° C. The high temperature treatment conditions used are too extreme for most microorganisms. As a result, aseptic conditions are not required during the treatment protocols. As a result, crumb rubber source material can be used with only minimal washing or pretreatment.

Incubation times of between 2 to 72 hours were evaluated. Results indicate that treatment intervals of 20 hours using a 10/40 v/v of bacterium to crumb rubber provided effective treatment times. Shorter time intervals showed less improvement. Treatment intervals of up to 72 hours showed no significant differences over the 20 hour treatment results. Accordingly, a 20 hour treatment interval was adopted for the purposes of additional testing and study.

Following the incubation times, the samples were removed by filtration and the crumb rubber was washed with distilled water and air dried. No visible differences were seen between the treated and untreated crumb rubber samples. The treated samples retained the initial particle size, though it is noted that the treated samples have a tendency to clump together when manually pressed.

The physical properties and applicable treatment intervals for the treated crumb and new rubber combinations are set forth in Table 1 along with comparative data for new tire rubber compounds and untreated crumb rubber based compounds. Samples were evaluated by incorporating the treated samples and appropriate controls into a literature formula tread composition (Bierkes) followed by a Banbury test. Loading levels of treated crumb rubber at 12 percent and 20 percent load levels were made by incorporating the treated crumb rubber into a masterbatch mix and mixing the materials in the mill. For example, a 20 percent loading of treated crumb rubber utilized a 160 gram loading of treated crumb rubber to 800 grams of masterbatch mix. The uncured and cured properties of the resulting mixtures along with appropriate controls were measured and are reported in Table 1.

The blending of 20 percent untreated crumb rubber with new tire rubber results in a rubber compound in which key physical properties significantly deteriorate. The biotreatment process recovers some of these properties. The "delta" value in Table 2 is the percentage of the loss in properties observed in the untreated crumb rubber compound that is regained in the treated crumb rubber compound. Thus, the delta value of the treated compound that showed no improvement over the untreated compound would be 0 percent. The delta value of treated compound that achieved the same properties as all new tire rubber would be 100 percent. Note that the table shows for each biotreated sample of crumb rubber, a value for "elongation @ break" greater than 100 percent. The data indicate that the property of the treated crumb rubber compound was better than the property of the new tire rubber compound.

It should be noted that the new tire rubber compound values used for these delta calculations are conservative and are within a range of values for new tire rubber compound samples that were tested.

The delta values for Table 2 are calculated as follows:

Delta=[(value of 20% treated rubber compound)−(value of 20% untreated rubber compound)]

divided by [(value of new tire rubber compound)−(value of 20% untreated rubber compound)]

The present invention provides an improved crumb rubber product in which the desired chemical and physical reactivity with new rubber formulations is substantially enhanced. As reflected by the data in Tables 1 and 2, the biotreatment of the crumb rubber allows cured rubber mixtures having 20% loading levels of treated crumb rubber. Consistently, the overall properties of the resulting cured rubber improved over the comparable control mix using untreated crumb rubber. The biotreatment improves certain parameter values such that the treated crumb rubber achieves properties more like the virgin rubber. The improvement is believed to be attributable to the altered surface chemistry of the treated crumb rubber. The treated surface of the crumb rubber favors useful co-polymerization with new tire or virgin polymer stocks. As a result, the overall cured composition has many improved qualities over similar compounds using untreated crumb rubber.

It is important to note that the treated crumb rubber was evaluated at levels of 12 percent (unreported) and 20 percent loadings. The favorable results obtained at both loading levels suggest loading levels of between 25–30 percent, or up to 50 percent or higher, may be used in tire and non-tire applications and still obtain a desirable cured end product. It should also be noted that additional improvements are obtainable by selection of a desired size of crumb rubber for treatment and use. A relatively large sized crumb rubber particle was used in the present studies. However, various advantages may be gained by varying the particle size. Larger size particles offer an ability to make use of the

TABLE 1

|  | New Tire Rubber Compound | 20% Untreated Crumb Rubber Compound | 20% Biotreated Crumb Rubber Compound | | | |
| --- | --- | --- | --- | --- | --- | --- |
|  |  |  | CF83 20 hrs | CF86 5 hrs | CF104 40 hrs | CF108 10 hrs |
| Uncured Properties |  |  |  |  |  |  |
| Plasticity, Mooney units | 60.5 | 87.3 | 73 | 69.2 | 80.6 | 86.4 |
| Scorch (t5), minutes | 24.58 | 20.26 | 19.90 | 19.90 | 19.53 | 20.12 |
| (t35), minutes | 28.62 | 24.47 | 24.37 | 25.28 | 23.43 | 23.70 |
| Min. Viscosity, Mooney units | 41.24 | 62.67 | 50.67 | 47.80 | 66.51 | 61.99 |
| Cured Properties |  |  |  |  |  |  |
| Shore Hardness | 67.7 | 66.1 | 66.9 | 67.7 | 66.5 | 66.4 |
| Modulus at 100%, MPa | 2.43 | 2.02 | 2.07 | 2.13 | 2.04 | 2.01 |
| Modulus at 300%, MPa | 3.44 | 2.66 | 2.46 | 2.12 | 2.46 | 2.53 |
| Tensile Strength, MPa | 21.51 | 16.38 | 16.56 | 13.37 | 16.44 | 15.80 |
| Elongation @ break, % | 421 | 414 | 449 | 441 | 445 | 423 |
| Energy @ break, Joules | 16.64 | 12.54 | 14.60 | 12.49 | 14.37 | 12.79 |
| G' (10%), MPa | 2.679 | 2.935 | 3.118 | 3.461 | 3.004 | 2.974 |
| Tan delta | 0.288 | 0.275 | 0.314 | 0.338 | 0.307 | 0.300 |
| Analytical Characterization |  |  |  |  |  |  |
| Acetone Extract, % by weight | 10.34 | 10.26 | 9.57 | 9.93 | 10.15 | 9.94 |
| Oxygen, % by weight | 1.63 | 1.42 | 1.48 | 1.68 | 1.43 | 1.36 |
| Polymer ratio | 100 SBR |  | 100 SBR/trNR | 100 SBR | 100 SBR/trNR | 100 SBR/trNR |
| Zinc Oxide, % by weight | 2.79 | 2.55 | 2.57 | 2.51 | 2.54 | 2.52 |
| Macro Ash, % by weight | 3.01 | 3.44 | 3.67 | 3.68 | 3.50 | 3.08 |

TABLE 2

|  | 20% Biotreated Crumb Rubber Compound | | | |
| --- | --- | --- | --- | --- |
|  | CF83 | CF86 | CF104 | CF108 |
| Plasticity | 53% | 67% | 25% | 3% |
| Tensile Strength | 3% | −59% | 1% | −11% |
| Elongation @ break | >200% | >200% | >200% | 128% |
| Energy @ break | 50% | −1% | 45% | 6% |

Delta = [(Value of 20% treated compound) − (value of 20% untreated rubber compound)] divided by [(Value of new tire rubber compound) − (value of 20% untreated rubber compound)]

existing cured rubber properties which are present within the interior of the treated crumb rubber particle. In effect, the treated crumb rubber alters only the surface chemistry. The various internal physical properties of the treated crumb rubber are not changed and may be used to advantage without having the costs associated with all virgin materials. As a result, the improved chemical reactivity is obtained without substantially diminishing or altering the desired physical properties which were preexisting in the crumb rubber.

One of ordinary skill in the art of rubber compounding and rubber compositions will readily appreciate that the treated crumb rubber can be used at greater relative quantities and/or with larger sizes than the untreated crumb rubber in new rubber mixes. As a result, a rubber formulation for a new tire can make use of an increased amount of treated crumb rubber. Such a formulation enables a lower cost tire and makes use of a recycled resource which remains underutilized.

The data set forth in the Example above indicate that the biotreatments of crumb rubber modify the crumb rubber surface chemistry to provide a more desirable crumb rubber. The treated crumb rubber interior is believed to retain the desirable physical properties which are compatible for reformulation with a new tire polymer mix. One limiting factor which has heretofore precluded higher levels of crumb rubber involves the presence of sulfur functional groups on the surface of the crumb rubber. By targeting important constituents in the biotreatment process, one can achieve higher loading levels of treated crumb rubber in new tire mixes and without compromising other physical properties of the crumb rubber.

The duration of the biotreatment of crumb rubber to achieve an effective crumb rubber suitable for combination with new rubber for commercial operation is readily determined by routine experimentation. Once the other operating parameters are selected, the extent of treatment can be determined by performing the treatments for different durations and concentrations until a satisfactory crumb rubber is obtained as determined by use in compounding a new rubber formulation and/or by other tests described herein.

The surface treated crumb rubber of the present invention may be used with a variety of tire tread cap rubber compositions such as those taught in U.S. Pat. No. 5,378,754, and U.S. Pat. No. 5,023,301, which are incorporated herein by reference. For instance, the devulcanized crumb rubber may be blended with a rubber selected from the group consisting of cis-1,4-polyisoprene (natural or synthetic), cis-1,4-polybutadiene, 3,4-polyisoprene, styrene/butadiene copolymers, styrene/isoprene/butadiene terpolymers, butadiene/acrylonitrile copolymers, isoprene/acrylonitrile copolymers, and mixtures thereof. The rubber may further contain a filler, such as carbon black, silica, and combinations thereof. The rubber and filler may then be blended with a desired amount of the surface treated rubber. The devulcanized rubber provides a sulfur curable exterior surface allowing a useful component for a rubber composition suitable for tires and recycled rubber products.

It is also believed that in addition to useful tread compositions, for a tread base or a tread cap, the devulcanized used rubber described in the present invention may be useful in compositions used in other tire applications such as sidewalls, beads, carcass plies, and belts.

It is well within the skill level of one in the art to prepare polymer mixtures of which the devulcanized rubber particulates may be added during a compound mixing stage. Further, it is well known in the art how to construct a conventional pneumatic tire having a tread comprised of a blend of natural rubber and solution-polymerized styrene/butadiene co-polymer rubber (SBR). As taught in the current invention, substantial loading levels of devulcanized crumb rubber may be incorporated into the polymer mix prior to the production of a tire. In general, one would expect the ground contacting surfaces of a tire tread having the devulcanized crumb rubber substituted for a portion of a filler, such as carbon black, to have an improved rolling resistance, or fuel economy, as compared to a tire made having a tread compound which uses carbon black or silica as a filling agent.

For certain articles such as belts, hoses, or shoe treads, it may be possible to use a 100 percent treated crumb rubber content for such articles.

In applications such as tires, a formulation having a higher percentage of crumb rubber may enable a lower cost tire. At the very least, a greater use of a recycled resource is achieved. Further, the crumb rubber treatment process provides an opportunity to add a material or filler having reinforcing properties to various components of a tire. While the data discussed above are directed primarily to tire tread formulations, a reinforcing filler such as crumb rubber may have utility in sidewall formulations and other compounded rubber portions of a cured tire.

Likewise, extensive use is made of rubber bladders in the tire manufacturing process. Such bladders may be constructed, at least in part, of a treated crumb rubber.

While there have been prior art efforts to use microorganisms to treat crumb rubber particulates, it is believed that the present process offers significant advantages. The data set forth herein indicate that after prolonged treatment times by the microorganisms, the treated rubber particles maintain their ability to mix and copolymerize with other rubber polymers. As a result, the risk of over-treatment noted in some of the prior art techniques is avoided with the present described process.

It is also envisioned that selected shapes of vulcanized crumb rubber can be treated with the above procedure to produce a treated reinforcing filler and which further provides a useful shape. For instance, while not separately reported herein, favorable formulations similar to those set forth above have been obtained with tire tread buffings. The buffings have a substantially greater length than width and may therefore impart additional physical characteristics to a polymer mix based upon their size and dimension.

Heretofore, crumb rubber recycling efforts have been directed toward a randomly shaped particle size. The present technology affords the opportunity to select a particular size, length, diameter, geometric shape in which the selected shape offers enhanced attributes in the tire construction. The selected non-random shape which may be stamped or formed from larger segments or pieces of rubber, may have varying attributes of hardness, elasticity, or other cured properties which, being preserved in the treatment and subsequent polymerization process, will impart the original mechanical properties to the resulting mix.

For instance, a treated crumb rubber having a selected shape and/or other physical property, such as hardness, may be blended in with a tread polymer to provide a heterogeneous tread mixture which incorporates therein intact particles of the treated crumb rubber. The properties of such a mixture may be advantageously different than a homogeneous mixture of blended liquid polymers.

Additionally, the prior art use of particulate crumb rubber and various treatment protocols for modifying the crumb rubber teach the use of an extremely fine, powder-like particulate. The present invention has been found suitable for use with much larger particles, and the use of the large particles is believed to afford additional advantages such as lower costs in resulting cured compositions such as tires and other molded rubber products.

In summary, the present invention provides an improved and economical process for treating crumb rubber with selected biological organisms to provide a treated crumb rubber having improved chemical and reactive properties. These improved properties permit the crumb rubber to be incorporated at higher loading levels than untreated crumb rubber when used in new tire polymer formulations. The ability to target chemical moieties (i.e., polysulfides) on the used rubber surface is thought to improve the surface reaction rates of the treated crumb rubber in new tire mixes, thereby allowing the treated crumb rubber to be used in new rubber mixes. By largely confining the treatment process to the surface of the crumb rubber, the useful mechanical and physical properties already inherent in the crumb rubber are maintained.

Further, the biological treatment of the crumb rubber particles allows the incorporation of larger particle sizes into a subsequent polymer formulation. As a result, the interior mechanical and physical properties associated with the crumb rubber particle can be maintained in the subsequent formulation.

In view of the foregoing disclosure and examples, it is well within the ability of one skilled in the relevant art to make modifications and variations to the disclosed embodiments and examples, including the use of equivalent and even dissimilar materials and process steps without departing from the spirit of the invention.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged both in whole or in part. Therefore, the spirit and scope of the appended claims should not be limited to the description of the preferred versions contained therein.

What is claimed is:

1. A tire tread compound comprising:

a base polymer of natural or synthetic rubber;

a reinforcing filler comprising between about 12 to about 35 percent by weight of a previously vulcanized particulate rubber, the particulate rubber having an exterior surface which is substantially devulcanized by exposure to a sulfur metabolizing bacterium; and, a filler selected from the group of carbon black, silica, and combinations thereof.

2. A method of preparing a tire tread rubber composition comprising the sequential steps of:

blending a rubber selected from the group consisting of cis-1,4-polyisoprene (natural or synthetic), cis-1,4-polybutadiene, 3,4-polyisoprene, styrene/butadiene copolymers, styrene/isoprene/butadiene terpolymers, butadiene/acrylonitrile copolymers, isoprene/acrylonitrile copolymers, and mixtures thereof, the rubber further containing a filler selected from the group of carbon black, silica, and combinations thereof; and, blending in a plurality of rubber particulates, each particulate having a sulfur curable exterior surface produced by exposure to a sulfur metabolizing bacterium to form a rubber composition having a particulate concentration of at least about 20 percent by weight of the tire tread composition.

3. A cured molded article comprising:

about 10 to about 50 percent by weight of a recycled crumb rubber particulate, the crumb rubber particulate having a modified outer particulate sulfur-curable surface, the exterior surface produced by exposure to a sulfur metabolizing bacterium;

about 10 to about 90 percent by weight of a natural or synthetic tire tread rubber; and about 0 to about 50 percent by weight of a non-reinforcing filler.

4. The molded article according to claim 3, wherein the crumb rubber particulate has an average size of at least about 80 mesh.

5. The molded article according to claim 3, wherein the crumb rubber particulate has an average size of at least about 40 mesh.

6. A process of combining scrap vulcanized rubber with a new tire tread rubber polymer, comprising the steps of:

providing a plurality of scrap particles of vulcanized crumb rubber, the particles having an average particle size ranging from about 200 to about 40 mesh;

oxidizing sulfur-containing vulcanization products on the surface of the crumb rubber particles with a sulfur metabolizing bacterium, thereby providing surface oxidized particles, the interior of the surface oxidized particles retaining useful vulcanized properties; and combining the surface oxidized particles with new tire tread rubber polymer and forming cross-link bonds between the new rubber and the surface of the oxidized rubber particles.

7. A cured rubber article comprising:

a first polymer component comprising a new tire tread polymer;

a second polymer component comprising a plurality of used rubber particles, the plurality of particles having an exterior surface modified by exposure to a sulfur metabolizing bacterium, the bacterium altering the sulfur chemistry of the surface of the used rubber particles, thereby rendering the surface of rubber particles compatible with the new tire tread polymer.

8. The article according to claim 7 wherein the second polymer component is mixed with said first polymer component in an amount of between about 12% to about 20% by weight.

9. The article according to claim 8 wherein the article has an elongation at break value greater than an article comprising 100 percent virgin polymer.

10. The article according to claim 7 wherein the second polymer further comprises a crumb rubber having an average mesh size of at least 40.

* * * * *